United States Patent
Sopko et al.

(10) Patent No.: US 7,679,311 B2
(45) Date of Patent: Mar. 16, 2010

(54) SYSTEM AND METHOD FOR DYNAMIC FIELD WEAKENING

(75) Inventors: Thomas Michael Sopko, East Peoria, IL (US); Jackson Wai, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 286 days.

(21) Appl. No.: 11/819,935

(22) Filed: Jun. 29, 2007

(65) Prior Publication Data

US 2009/0001924 A1    Jan. 1, 2009

(51) Int. Cl.
*H02P 3/18* (2006.01)

(52) U.S. Cl. .................... 318/812; 318/727; 318/779; 318/808

(58) Field of Classification Search ........... 318/812, 318/801, 727, 779, 798, 799, 807, 808, 809
See application file for complete search history.

(56) References Cited

U.S. PATENT DOCUMENTS

| | | | |
|---|---|---|---|
| 4,267,499 A | 5/1981 | Kurosawa | |
| 4,458,193 A | 7/1984 | Jönsson | |
| 4,677,360 A | 6/1987 | Garces | |
| 5,066,899 A | 11/1991 | Nashiki | |
| 5,532,571 A * | 7/1996 | Masaki et al. | 318/809 |
| 5,650,700 A * | 7/1997 | Mutoh et al. | 318/432 |
| 6,104,159 A | 8/2000 | Seok | |
| 6,184,648 B1 * | 2/2001 | Kato et al. | 318/811 |
| 6,541,937 B2 * | 4/2003 | Kato | 318/727 |
| 6,707,270 B2 | 3/2004 | Chen et al. | |
| 6,842,673 B2 * | 1/2005 | Zhang et al. | 701/22 |
| 6,844,701 B2 | 1/2005 | Chen et al. | |
| 7,152,707 B2 | 12/2006 | Matsuda | |

FOREIGN PATENT DOCUMENTS

| | | |
|---|---|---|
| EP | 1 622 253 A2 | 2/2006 |
| JP | 58-179196 | 10/1983 |
| JP | 63-15693 | 1/1988 |
| JP | 6-253575 | 3/1993 |
| JP | 2006-42562 | 2/2006 |

* cited by examiner

*Primary Examiner*—Bentsu Ro
*Assistant Examiner*—Thai Dinh
(74) *Attorney, Agent, or Firm*—Finnegan, Henderson, Farabow, Garrett & Dunner; Jandá M. Carter

(57) ABSTRACT

A field weakening control system for use with an induction motor is disclosed. The field weakening control system has a sensing device configured to generate a signal indicative of a speed of the induction motor and a controller. The controller is configured to determine an initial voltage command based on the signal and determine an acceleration of the induction motor based on the signal. The controller is also configured to generate a desired voltage command based on at least one of the initial voltage command and the acceleration.

8 Claims, 3 Drawing Sheets

SYSTEM AND METHOD FOR DYNAMIC FIELD WEAKENING

TECHNICAL FIELD

The present disclosure is directed to dynamic field weakening and, more particularly, to a system and method for dynamic field weakening in an induction motor.

BACKGROUND

Induction motors are used to provide mechanical power in a variety of applications such as, for example, driving traction devices, wind tunnels, pipeline compressors, washing machines, dishwashers, standalone fans, and record players. Induction motors are electrically driven by a current to generate a mechanical torque output. That is, changing currents within components (e.g. field windings) of the induction motor create an electromagnetic flux, and a rotating member of the induction motor is caused to rotate by one or more currents interacting with the magnetic flux (e.g. in accordance with the principle of Lorentz force). The current applied to an induction motor can be regarded as a vector with two components: a torque current component $i_q$, and a flux current component $i_d$. By controlling these current components using associated respective voltages applied to the induction motor, the electromagnetic flux and output torque of the induction motor can be controlled. For example, voltage commands can be delivered to an inverter to control the inverter to produce one or more desired voltages. The desired voltages can then be applied to the induction motor to cause desired torque and flux current components to flow within the induction motor, thus inducing a desired mechanical torque output from the induction motor in accordance with known principles (e.g. Lorentz force).

During normal operation of an induction motor, the induction motor will generate a counter-electromotive force ("back EMF") which opposes the voltage applied to the induction motor. There is a speed threshold above which the back EMF becomes greater than the voltage applied to the induction motor, which can cause the induction motor to operate undesirably or to cease operation entirely. A method known as "field weakening" is employed to reduce the back EMF (i.e. maintain the back EMF at or below a desired level for operation of the induction motor) to allow the induction motor to operate at high speeds (e.g. speeds faster than the speed threshold).

Field weakening methods generally include reducing the flux of an induction motor when the induction motor speed increases beyond a predetermined speed threshold, and maintaining the flux of the induction motor at or above a normal flux level when the induction motor speed is below a predetermined threshold (i.e. when the induction motor is experiencing a normal operation) to increase the operational efficiency of the induction motor. For example, this can be accomplished by delivering voltage commands to an inverter such that the flux current component delivered to the induction motor is reduced. Field weakening methods can further include using the voltage commands to increase the torque current component such that the mechanical torque output of the induction motor can be maintained at or above a level for efficient operation of the induction motor. However, during aggressive acceleration/deceleration events (i.e. relatively fast changes in motor speed), the traditional field weakening method reacts relatively slowly to the fast changes in motor speed and causes the motor to operate undesirably. For example, the motor may generate an undesirable output torque and thus function inefficiently, and/or experience overmodulation (i.e. distortions in electrical waveforms associated with operation of the motor). Thus, there is a need for a field weakening control method that improves the transient performance capability of an induction motor during aggressive acceleration/deceleration events while maintaining the efficiency of the induction motor during other field weakening events (i.e. high speed events) and normal motor operation.

One field weakening control method for handling an induction motor during an excessive state of speed increase or decrease is disclosed in U.S. Pat. No. 6,104,159 ("the '159 patent") issued to Seok. Specifically, the '159 patent discloses a field weakening control method wherein a voltage limit is established in an oval on a current plane and a current limit is established in a circle on the same current plane. The current plane has a flux current portion $i_d$ along its x-axis and a torque current portion $i_q$ along its y-axis such that each point on the current plane corresponds to a respective current command. The circle is centered about the origin of the current plane and the oval is a translation δ units in the negative $i_d$ direction of an oval centered about the origin. A major axis of the oval is parallel with the y-axis of the current plane. The intersection of the oval and the circle corresponds to those current commands used during excessive states of the induction motor, while a region not within the intersection of the oval and the circle corresponds to those current commands used during other states of the induction motor. Within the intersection of the oval and the circle, desired current values $i^e_{ds}$ and $i^e_{qs}$ for the flux current portion and the torque current portion, respectively, are calculated according to the following formulas:

$$i^e_{ds} = \frac{-L_s \delta \sqrt{(L_s \delta)^2 + (L_s^2 - L_\sigma^2)(V_{smax}/\omega_e)^2 - \delta^2 - L_\sigma^2 I_{smax}^2}}{L_s^2 - L_\sigma^2}$$

where:

$$\delta = \frac{L_m}{L_r} \alpha e^{\frac{1}{\tau_1}}$$

$$i^e_{qs} = \sqrt{I_{smax}^2 - i_{ds}^{e2}}$$

where $L_s$ is a stator self inductance, $L_\sigma$ is a leakage inductance, $L_m$ is a magnetizing inductance, $L_r$ is a rotor self inductance, and $\omega_e$ is an excitation angular frequency. Within the region not included in the intersection of the oval and circle, desired current values for the flux current portion and the torque current portion are calculated according to the following formulas:

$$i^e_{ds} = \frac{-b + \sqrt{b^2 - 4ac}}{2a}$$

where:

$$a = 2L_m L_s^2,$$

$$b = L_s^2 \alpha e^{\frac{-1}{\tau}} + 3L_m L_s \delta,$$

$$c = L_s \delta \alpha e^{\frac{-1}{\tau}} + L_m \delta^2 - L_m (V_{smax}/\omega_e)^2$$

$$i^e_{qs} = \frac{\sqrt{(V_{smax}/\omega_e)^2 - (L_s L^e_{ds} + \delta)^2}}{L_\sigma}$$

where $L_s$ is a stator self inductance, $L_m$ is a magnetizing inductance, and $\omega_e$ is an excitation angular frequency.

While the field weakening control method of the '159 patent may increase efficiency of an induction motor during excessive acceleration/deceleration states, it may be expensive to use. More specifically, because the field weakening control method requires the execution of several complicated mathematical formulas in order to determine desired current commands, it may require one or more relatively expensive processors and/or microprocessors equipped with high-end arithmetic units and/or other components for processing complicated mathematical formulas.

Further, the complicated formulas may require a large amount of processor resources, thus preventing the processor or microprocessor using the method from executing other tasks efficiently. For example, an engine control module may fail to regulate fuel injection for an undesirably long amount of time while processing the formulas of the '159 patent. Alternatively, a dedicated processor or microprocessor could be used to implement the method of the '159 patent, but the dedicated processor or microprocessor may be expensive, as discussed above.

Further still, the field weakening control method of the '159 patent may be difficult to implement. That is, because the method of the '159 patent requires that the stator self inductance, leakage inductance, magnetizing inductance, and rotor self inductance be known in order to calculate the desired current commands, it may be difficult or impossible to use a single unit implementing the method with two induction motors having different values for those constants.

The present disclosure is directed to overcoming one or more of the problems set forth above.

SUMMARY OF THE INVENTION

One aspect of the present disclosure is directed to a field weakening control system for use with an induction motor. The field weakening control system includes a sensing device configured to generate a signal indicative of a speed of the induction motor, and a controller. The controller is configured to determine an initial voltage command based on the signal, and determine an acceleration of the induction motor based on the signal. The controller is also configured to generate a desired voltage command based on at least one of the initial voltage command and the acceleration.

Another aspect of the present disclosure is directed to a method of controlling field weakening in an induction motor. The method includes monitoring a speed of the induction motor and determining an initial voltage command based on the speed of the induction motor. The method also includes determining an acceleration of the induction motor. The method further includes generating a desired voltage command based on at least one of the initial voltage command and the acceleration.

DETAILED DESCRIPTION

Figure 1:
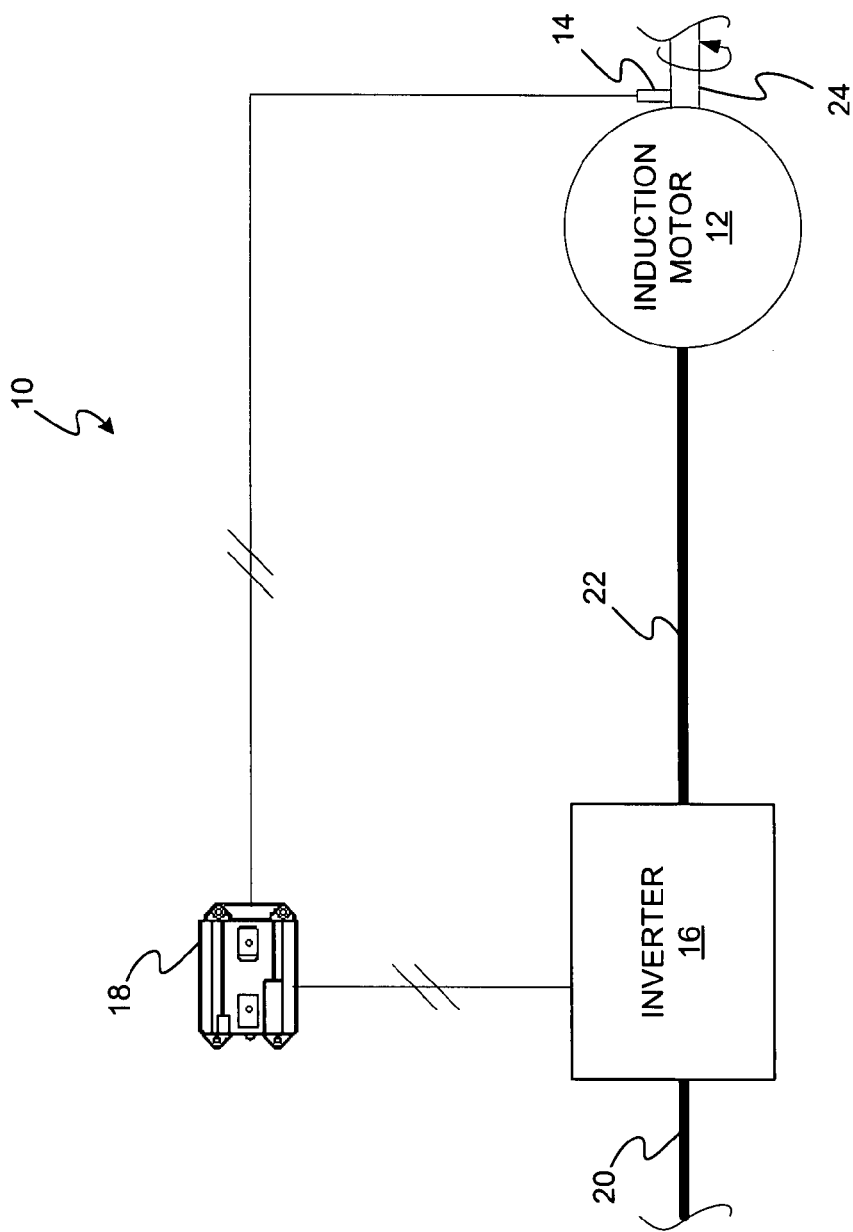
FIG. 1 is a diagrammatic illustration of an exemplary disclosed field weakening control system.

FIG. 1 illustrates a field weakening control system 10 having an induction motor 12, a sensing device 14, an inverter 16, and a controller 18. Field weakening control system 10 may generally receive a direct current ("DC") signal from a DC bus 20, convert the DC signal to one or more voltages, and produce one or more AC currents to drive a mechanical output of induction motor 12. The mechanical output of induction motor 12 may be at least partially controlled by inverter 16 and controller 18. As such, field weakening control system 10 may be associated with and/or included in a machine that is driven by a mechanical output of induction motor 12. For example, the mechanical output of induction motor 12 may drive a traction device, a wind tunnel, a pipeline compressor, a washing machine, a dishwasher, a standalone fan, and/or a record player.

Induction motor 12 may be generally operable to receive one or more alternating current ("AC") signals from an AC bus 22 and use them to produce a mechanical power output having a speed and a torque. For example, induction motor 12 may embody a three-phase induction motor connected to receive three-phase AC power from inverter 16. It should be appreciated, however, that induction motor 12 may alternatively embody any type of induction motor known in the art, such as, for example, a single-phase induction motor or a two-phase induction motor. The AC signals from AC bus 22 may include one or more AC voltages, which may cause one or more AC currents to flow through one or more components of induction motor 12, as is known in the art. It should be appreciated that induction motor 12 may also be operable to receive mechanical power and use it to generate variable frequency, variable voltage AC power (e.g. operable as an AC generator), as is known in the art.

Induction motor 12 may generally include a stationary component (e.g. a stator, not shown) and a rotating component (e.g. a rotor, not shown). The one or more AC signals may be delivered to the stator, and may generate a changing magnetic field (i.e. a magnetic flux). It should be appreciated that the one or more AC signals may additionally or alternatively be delivered to the rotor of induction motor 12 via, for example, one or more slip rings. The changing magnetic field may interact with the one or more AC currents of induction motor 12 to cause a force such as, for example, a Lorentz force, to act upon one or more components of induction motor 12. For example, the Lorentz force may cause the rotor to rotate, as is known in the art. In this manner, the mechanical output of induction motor 12 may embody a rotation of a shaft 24 mechanically coupled with the rotor. The electromagnetic flux and torque output of induction motor 12 may be at least partially determined by the one or more AC signals from AC bus 22. As is known in the art, the one or more AC currents of induction motor 12 may be regarded as a vector current having a torque current component $i_q$, and a flux current component $i_d$. As such, the electromagnetic flux and torque of induction motor 12 may be at least partially managed by controlling the one or more AC voltages such that the one or more AC currents induced thereby may include a desired torque current component and/or a desired flux current component. One skilled in the art will appreciate that during operation of induction motor 12, induction motor 12 may generate a back EMF in proportion to the speed of induction motor 12. As discussed above, if the back EMF is allowed to become large, it may cause induction motor 12 to operate undesirably. As is known in the art, while the back EMF may increase in proportion to the speed of induction motor 12, the back EMF may be reduced in proportion to the flux of induction motor 12 (i.e. the one or more AC signals may be controlled to reduce the flux of induction motor 12, thus reducing the back EMF of induction motor 12). As such, the one or more AC signals may be controlled to reduce the back EMF by reducing the flux of induction motor 12 (i.e. a field weakening mode may be initiated) when the speed of induction motor 12 rises above a predetermined speed threshold. As such, it may be desirable to monitor the speed of induction motor 12.

Sensing device 14 may be configured to sense the speed of induction motor 12. For example, sensing device 14 may embody a magnetic pickup sensor configured to sense a rotational speed of induction motor 12 and to produce a signal corresponding to the rotational speed. Although shown in FIG. 1 adjacent shaft 24, it should be appreciated that sensing device 14 may alternatively be disposed adjacent the rotor of induction motor, or on any other suitable component of field weakening control system 10 to produce a signal corresponding to the rotational speed of induction motor 12. It is contemplated that sensing device 14 may alternatively or additionally be included within one or more other components of field weakening control system 10 or an associated machine. For example, sensing device 14 may be included in induction motor 12. Further, it should be appreciated that sensing device 14 may alternatively embody a virtual sensor and that the signal corresponding to the rotational speed of induction motor 12 may embody a self-sensing signal, whereby the speed of induction motor 12 may be determined by induction motor 12 and/or an associated machine, as is known in the art. For example, controlled electrical noise may be provided to field weakening control system 10, and a processor may be used to determine the speed of induction motor 12 based on changes in the controlled electrical noise. It is also contemplated that the speed of induction motor 12 may be determined in any other means known in the art. In one embodiment, the signal generated by sensing device 14 may indicate the rotational speed of induction motor 12 in Hz (i.e. radians per second). Alternatively, the signal generated by sensing device 14 may indicate the rotational speed of induction motor 12 in any appropriate unit such as, for example, revolutions per minute ("rpm").

Inverter 16 may be generally operable to receive DC power and use it to generate one or more AC signals. For example, inverter 16 may generate one or more AC signals to power induction motor 12. That is, inverter 16 may receive DC power from DC bus 20, and deliver the one or more AC signals to induction motor 12 via AC bus 22. It should be appreciated that the one or more AC signals generated by inverter 16 may include one or more AC voltages such that, when applied to induction motor 12 via AC bus 22, the one or more AC voltages may cause one or more AC currents to flow through one or more components of induction motor 12, as discussed above. Inverter 16 may embody any inverter known in the art. That is, inverter 16 may embody any combination of power electronics, hardware, and/or software operable to convert DC power to AC power. For example, inverter 16 may embody a three-phase inverter configured to generate three current signals to power induction motor 12. It should be appreciated that inverter 16 may operate through the use of one or more switches or similar devices to convert DC power to AC power. For example, inverter 16 may include any number of thyristors, insulated gate bipolar transistors (IGBTs), metal-oxide-semiconductor field-effect transistors (MOSFETs), bipolar junction transistors (BJTs), resistors, capacitors, inductors, diodes, etc., configured to operate according to the present disclosure. It should also be appreciated that many such circuits are known in the art, including, but not limited to, switched-mode power supplies, diode bridge full-wave rectifiers, H-bridge inverters, etc. It should further be appreciated that inverter 16 may be operable in a reverse mode wherein inverter 16 acts as a converter (i.e. inverter 16 may receive one or more AC signals from AC bus 22 and use them to generate DC power delivered to DC bus 20).

A frequencies and/or voltages of the one or more AC signals generated by inverter 16 may be controllable. For example, the frequencies and/or voltages of the one or more AC signals may be at least partially determined by switch timings and/or operating positions of one or more of the switches of inverter 16, as is known in the art. Thus, the one or more AC signals generated by inverter 16 may be controlled such that the AC currents caused by applying the voltages to induction motor 12 may include the desired torque current component and the desired flux current component of induction motor 12. That is, the desired torque current component and the desired flux current component may correspond to one or more desired voltages, switch timings, and/or operating positions of one or more switches of inverter 16. One or more of these desired values may be communicated to inverter 16 in the form of a voltage command. That is, inverter 16 may be configured to receive a voltage command indicative of the desired current components. It should be appreciated that the voltage command may embody a plurality of voltage commands, if desired. The voltage command may indicate, in any means known in the art, switch timings and/or operating positions of the one or more switches of inverter 16 such that the one or more AC currents caused by the one or more AC signals generated by inverter 12 may include the desired current components. In one example, the voltage command may embody one or more current commands including a signal indicative of the desired torque current component (i.e. a torque current command) and a signal indicative of the desired flux current component (i.e. a flux current command), and inverter 16 may determine the switch timings and/or operating positions of the one or more switches of inverter 16 based on the voltage command, as is known in the art. In another example, the voltage command may include one or more signals indicative of the desired voltages, and inverter 16 may determine the switch timings and/or operating positions of the one or more switches of inverter 16 based on the voltage command, as is known in the art. Alternatively, the voltage command may embody one or more gate commands indicative of the switch timings and/or operating positions of the one or more switches of inverter 16. The voltage command may be generated and delivered to inverter by controller 18.

Controller 18 may be generally operable to monitor the speed of induction motor 12 and generate a voltage command indicative of a desired flux current component and/or a desired torque current component of induction motor 12 based on the speed. For example, controller 18 may be communicatively coupled with sensing device 14 to receive the signal generated thereby, and communicatively coupled with inverter 16 to deliver the voltage command thereto. In this manner, controller 18 may control the frequencies and/or voltages of the one or more AC signals generated by inverter 16. It is contemplated that controller 18 may also be communicatively coupled with induction motor 12 to receive signals generated thereby and/or deliver signals thereto. As such, controller 18 may embody a single microprocessor or multiple microprocessors that include a means for processing the signal generated by sensing device 14. For example, controller 18 may include a memory, a secondary storage device, and a processor, such as a central processing unit or any other means for processing the input signals. Numerous commercially available microprocessors, microcontrollers, digital signal processors (DSPs), and other similar devices may be configured to perform the functions of controller 18. It should be appreciated that controller 18 may include one or more of an application-specific integrated circuit (ASIC), an FPGA, a computer system, and a logic circuit, configured to allow controller 18 to function in accordance with the present disclosure. Thus, the memory of controller 18 may embody, for example, the flash memory of an ASIC, flip-flops in an FPGA, the random access memory of a computer system, or a memory circuit contained in a logic circuit. It should be appreciated that controller 18 may embody a controller responsible for one or more other components, such as, for example, an engine control module, or an inverter controller. Controller may alternatively or additionally be communicatively coupled with an external computer system.

Figure 2:
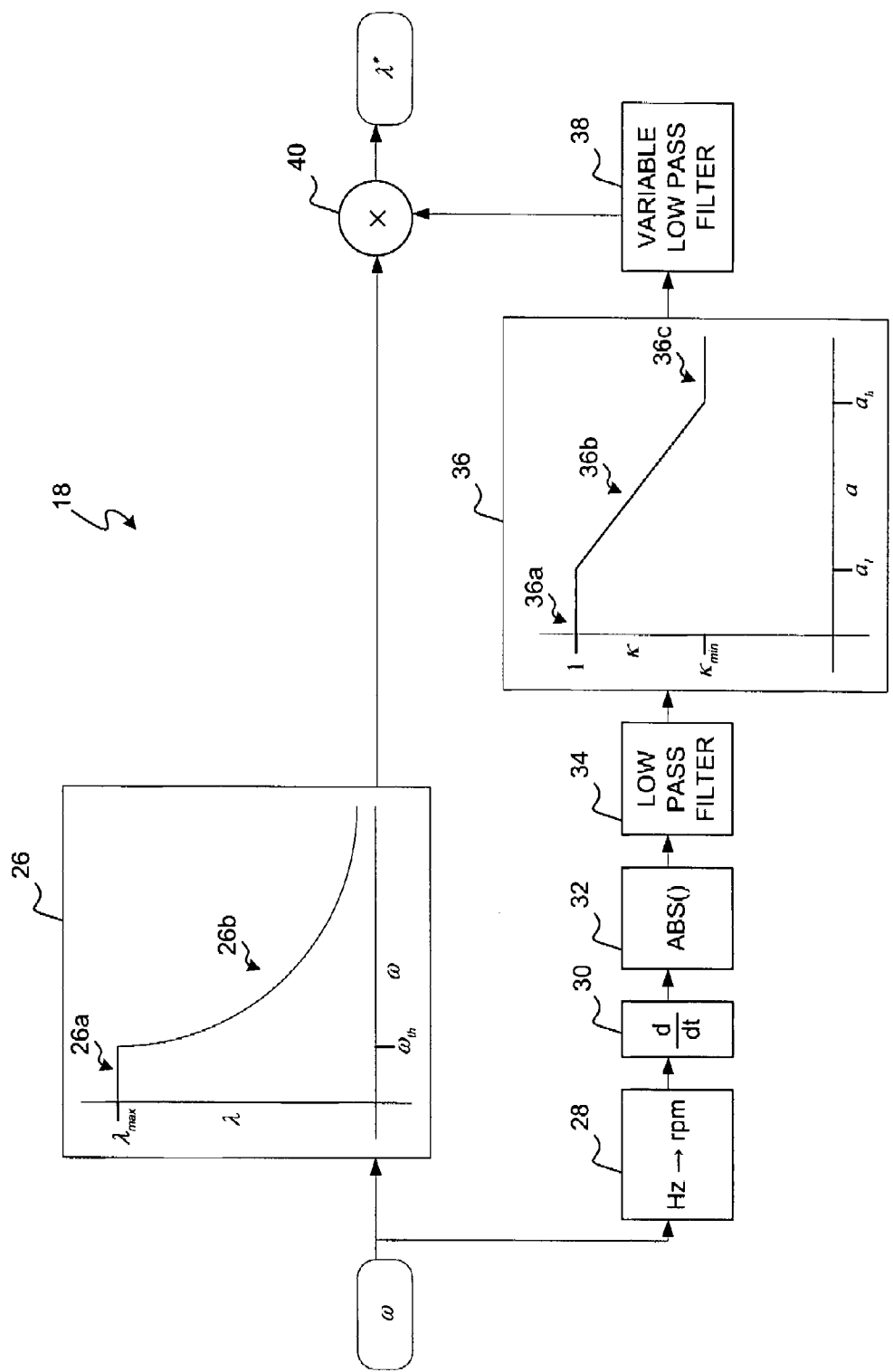
FIG. 2 is diagrammatic and schematic illustration of a controller for use with the field weakening control system of FIG. 1.

FIG. 2 illustrates an exemplary embodiment of controller 18 operable to generate the desired voltage command ("λ*") as a function of the rotational speed ("ω") of induction motor 12. It should be appreciated that rotational speed ω may alternatively refer to a signal representative of the rotational speed of induction motor 12 (e.g. the signal generated by sensing device 14). As such, controller 18 may include a flux map 26, a speed converter 28, a differentiator 30, an absolute value block 32, a low pass filter 34, a de-rate factor map 36, a variable low pass filter 38, and a multiplier 40. Although described in further detail below, it should be appreciated that each of these components may be implemented as software, hardware, or any combination thereof. Controller 18 may be operable to initiate a field weakening mode of induction motor 12 (i.e. reduce the magnetic flux of induction motor 12) when the speed of induction motor 12 rises above a predetermined speed threshold. Additionally, controller 18 may be operable to further reduce the magnetic flux of induction motor 12 during aggressive acceleration/deceleration events.

Flux map 26 may generally map a rotational speed to an initial voltage command ("λ"). That is, flux map 26 may accept a signal indicative of the speed of induction motor 12 as an input, and produce an initial voltage command as an output. It is contemplated that flux map 26 may determine the initial voltage command based on the received signal in any means known in the art. For example, flux map 26 may be configured to receive the signal, map it to an initial voltage command, and produce the initial voltage command as an output. It is contemplated that in mapping the signal to an initial voltage command, flux map 26 may determine any other desired values of induction motor 12, such as, for example, a desired torque current component, a desired flux current component, a desired torque output of induction motor 12, and/or one or more desired AC voltages to be applied to induction motor 12. Flux map 26 may be included within the memory of controller 18. Although flux map 26 may be shown as a non-linear mapping, it should be appreciated that flux map 26 may embody any mapping of signals and/or rotational speeds to voltage commands, such as, for example, a linear mapping, a quadratic mapping, a step-wise mapping, or any other mapping known in the art. In one exemplary embodiment of the disclosure, flux map 26 may include a constant voltage command portion 26a and a field weakening portion 26b, while a magnitude of the voltage commands may be positively related to a magnitude of a corresponding desired flux current component. For example, constant voltage command portion 26a may map substantially all input speeds below a predetermined speed threshold ("$\omega_{th}$") to a predetermined maximum voltage command ("$\lambda_{max}$"), while field weakening portion 26b may map substantially all input speeds above the predetermined speed threshold to voltage commands less than the predetermined maximum voltage command (e.g. voltage commands directed to creating a smaller flux current component than a maximum flux current component). Further, the voltage commands may generally decrease as the input speed increases above the predetermined speed threshold.

Speed converter 28 may generally convert a speed from one unit of measurement to another. That is, speed converter 28 may accept a first signal indicative of a speed represented in a first unit of measurement as an input, and produce a second signal indicative of the speed represented in a second unit of measurement as an output. For example, speed converter 28 may be configured to receive a first signal indicative of the rotational speed of induction motor 12 in Hz, convert it to a second signal indicative of the rotational speed of induction motor 12 in rpm, and produce the second signal as an output.

Differentiator 30 may generally differentiate a transient (i.e. time-varying) input signal and produce a mathematical derivative over time of the transient input signal. That is, differentiator 30 may accept a transient input signal, and produce a transient output signal substantially equal to a time derivative of the transient input signal. For example, differentiator 30 may be configured to receive the rotational speed of induction motor 12 in rpm as an input, differentiate it over time, and produce the time derivative of the rotational speed of induction motor 12 (i.e. a rotational acceleration of induction motor in rpm/second). It should be appreciated that differentiator 30 may alternatively differentiate the rotational speed of induction motor 12 in Hz, and that speed converter 28 may be omitted or moved downstream of differentiator 30 and replaced with a similar acceleration converter, if desired. It should be appreciated that known differentiators may be used to perform the functions of differentiator 30. It should also be appreciated that the acceleration of induction motor 12 may be monitored in any other means known in the art and that differentiator 30 may be omitted, if desired.

Absolute value block 32 may generally produce, as an output, a signal indicative of an absolute value of an input signal. That is, absolute value block 32 may accept an input signal that may represent a value greater than, equal to, or less than zero, and produce an output signal representative of a positive (i.e. greater than or equal to zero) magnitude of the input signal. For example, absolute value block 32 may be configured to receive the rotational acceleration of induction motor 12 from differentiator 30, and produce an output signal substantially equal to a positive magnitude of the rotational acceleration of induction motor 12. It should be appreciated that known algorithms and/or hardware arrangements may be used to perform the functions of absolute value block 32.

Low pass filter 34 may generally pass low frequencies of an input signal and attenuate frequencies of the input signal that may be greater than a cutoff frequency. For example, low pass filter 34 may be configured to receive the output from absolute value block 32, attenuate frequencies of the output from absolute value block 32 that may be greater than a cutoff frequency, and produce an output signal substantially equal to the attenuated signal. It should be appreciated that in this manner, low pass filter 34 may be operable to filter high-frequency noise from the signal indicative of the acceleration of induction motor 12, including any noise that may be amplified by differentiator 30, as is known in the art. Thus, although low pass filter 34 may be shown downstream of absolute value block 32, it is contemplated that low pass filter 34 may alternatively be located upstream of absolute value block 32 and downstream of differentiator 30. It should be appreciated that low pass filter 34 may embody any known low pass filter, and that low pass filter 34 may be omitted, if desired.

De-rate factor map 36 may generally map an acceleration ("a") to a de-rate factor ("κ"). That is, de-rate factor map 36 may accept a signal indicative of an acceleration as an input, and produce a signal indicative of a de-rate factor as an output. For example, de-rate factor map 36 may be configured to receive the attenuated acceleration signal from low pass filter 34, map it to a de-rate factor, and produce a signal indicative of the de-rate factor as an output. It should be appreciated that as the attenuated acceleration signal from low pass filter 34 changes over time, so may the signal indicative of the de-rate factor. De-rate factor map 36 may be included within the memory of controller 18. Although de-rate factor map 36 may be shown as a piecewise linear mapping, it should be appreciated that de-rate factor map 36 may embody any mapping of signals and/or accelerations to de-rate factors, such as, for example, a non-linear mapping, a quadratic mapping, a step-wise mapping, or any other mapping known in the art. The de-rate factor may be a value between zero and one, and may generally indicate a proportion of the initial voltage command that should be used as a desired voltage command during aggressive acceleration/deceleration events. It should be appreciated that because the acceleration signal may be passed through absolute value block 32 before being passed to de-rate factor map 36, acceleration and deceleration may both be represented in the acceleration signal passed to de-rate factor map 36 by positive acceleration values. Thus, de-rate factor map 36 may include mappings only for positive acceleration values. It is contemplated, however, that absolute value map 32 may be omitted if desired, and that de-rate factor map 36 may alternatively include mappings for both positive and negative acceleration values.

In one exemplary embodiment of the disclosure, de-rate factor map 36 may include a first constant de-rate factor portion 36a, a variable de-rate factor portion 36b, and a second constant de-rate factor portion 36c. For example, first constant de-rate factor portion 36a may map substantially all input accelerations below a predetermined low acceleration threshold ("$a_l$") to a predetermined maximum de-rate factor (e.g. one). In this manner, the desired voltage command may be substantially equal to the initial voltage command for accelerations that are below the predetermined low acceleration threshold (i.e. when induction motor 12 may be operated outside of an aggressive acceleration/deceleration event). Similarly, second constant de-rate factor portion 36c may map substantially all input accelerations above a predetermined high acceleration threshold ("$a_h$") to a predetermined minimum de-rate factor ("$\kappa_{min}$"). In this manner, the desired voltage command may be maintained at or above a minimum voltage command for efficient operation of induction motor 12 (i.e. the output torque of induction motor 12 may be maintained at or above a level associated with efficient operation of induction motor 12). For input accelerations between the predetermined acceleration thresholds, de-rate factor map 36 may map the accelerations to de-rate factors less than the predetermined maximum de-rate factor and greater than the predetermined minimum de-rate factor. The de-rate factors may generally decrease as the input accelerations increase above the predetermined low acceleration threshold.

Variable low pass filter 38 may generally pass low frequencies of an input signal and attenuate frequencies of the input signal that may be greater than a variable cutoff frequency. That is, variable low pass filter 38 may operate similar to low pass filter 34, and the cutoff frequency of variable low pass filter 38 may be changed, if desired. For example, variable low pass filter 38 may be configured to receive the de-rate factor from de-rate factor map 36, attenuate frequencies of the de-rate factor (i.e. rates of changes in the de-rate factor) that may be greater than the cutoff frequency, and produce an output signal substantially equal to the attenuated signal. In this manner, variable low pass filter 38 may be operable to reduce a rate of change in the de-rate factor, thus reducing or eliminating fast changes in the magnetic flux of induction motor 12, which may cause induction motor 12 to operate undesirably (e.g. the output torque of induction motor 12 may fluctuate undesirably). It should be appreciated, however, that as induction motor 12 accelerates, it may be desirable to allow slightly faster changes in the de-rate factor to accommodate the increasing speed of induction motor 12. As such, the cutoff frequency may be controlled by controller 18 based on a change in the de-rate factor and/or a change in the acceleration of induction motor 12. For example, if the de-rate factor is increasing and/or the acceleration of induction motor 12 is decreasing, the cutoff frequency of variable low pass filter 38 may be set to a relatively low value (e.g. 1 Hz) to slow the change in the de-rate factor (e.g. to 1 Hz), as passed to multiplier 40. However, if the de-rate factor is decreasing and/or the acceleration of induction motor 12 is increasing, the cutoff frequency of variable low pass filter 38 may be set to a slightly higher value (e.g. 3 Hz) to allow the change in the de-rate factor to be passed to multiplier 40 at a relatively high speed (e.g. 3 Hz). It should be appreciated that variable low pass filter 38 may embody any known low pass filter with a controllable cutoff frequency, and that variable low pass filter 38 may be omitted, if desired. It should also be appreciated that variable low pass filter 38 may alternatively embody a low pass filter with a fixed cutoff frequency, if desired.

Multiplier 40 may multiply two signals. That is, multiplier 40 may accept a first input and a second input, and produce a product of the first and second inputs as an output. For example, multiplier 40 may be configured to receive the initial voltage command as a first input and the de-rate factor as a second input, multiply the first and second inputs to obtain the desired voltage command, and produce the desired voltage command as an output. It should be appreciated that the desired voltage command may be determined based on the initial voltage command and/or the de-rate factor by any other means known in the art and that multiplier 40 may be omitted, if desired.

INDUSTRIAL APPLICABILITY

The disclosed field weakening control system may be used with any induction motor application to maximize the efficiency of an induction motor. In particular, the disclosed system and method may provide efficient operation of an induction motor during aggressive acceleration/deceleration events by reducing the magnetic flux of the induction motor based on the magnitude of the acceleration/deceleration of the induction motor, and thus maintain the back EMF at or below an acceptable level. The disclosed system and method may further provide efficient operation of the induction motor outside of aggressive acceleration/deceleration events by reducing the magnetic flux when a speed of the induction motor increases beyond a predetermined threshold. The disclosed system and method may still further provide efficient operation of the induction motor outside of aggressive acceleration/deceleration events by maintaining the magnetic flux when the speed of the induction motor is below the predetermined threshold and the induction motor is not experiencing an aggressive acceleration/deceleration event (i.e. when the induction motor experiences normal operation), thus maximizing the output torque of the induction motor. The operation of field weakening control system 10 will now be described.

Referring to FIG. 1, inverter 16 may receive DC power from DC bus 20 and one or more voltage commands from controller 18. It should be appreciated that because the voltage commands from controller 18 may be determined based on a speed and/or an acceleration of induction motor 12, the voltage commands delivered to inverter 16 may vary over time. Inverter 16 may then use the DC power to generate and deliver one or more AC signals to induction motor 12. A frequency and/or voltage of the AC signals may be at least partially determined by the voltage commands from controller 18. For example, the voltage commands may indicate a switch timing and/or operating position of the one or more switches of inverter 16 such that the one or more AC signals produced by inverter 16 may include one or more desired AC voltages appropriate to control one or more AC currents through induction motor 12 to include a desired flux current component and/or a desired torque current component. The one or more AC signals may be passed to induction motor 12 via AC bus 22.

Induction motor 12 may be powered by the one or more AC signals to produce a mechanical power output (i.e. in the form of a rotation of shaft 24), as discussed above, and sensing device 14 may generate a signal indicative of a speed of induction motor 12. As discussed above, the one or more AC signals may cause one or more AC currents to flow through induction motor 12, and the one or more AC currents may include a desired flux current component and a desired torque current component. The output speed and/or torque of induction motor 12 may be controlled by the flux current component and the torque current component of the one or more AC signals (e.g. a Lorentz force may drive the mechanical output of induction motor 12). As discussed above, a back EMF may be generated by induction motor 12 corresponding to the speed of induction motor 12, and the back EMF may cause induction motor 12 to operate undesirably, if allowed to increase to a high level. As such, the flux current component and/or the torque current component of the one or more AC signals may be managed by controller 18 (i.e. in the form of the voltage commands delivered to inverter 16) such that the back EMF is maintained at or below an acceptable level for efficient operation of induction motor 12.

In particular, when the speed of induction motor 12 increases beyond a predetermined threshold, controller 18 may reduce the flux current component of the one or more AC signals to maintain the back EMF at or below an acceptable level and/or increase the torque current component to maintain the output torque of induction motor 12 at or above an acceptable level for efficient operation of induction motor 12. Further, when induction motor 12 experiences an aggressive acceleration/deceleration event (i.e. the speed of induction motor 12 changes relatively quickly), controller 18 may further decrease the flux current component to reduce the back EMF and/or further increase the torque current component to maintain the output torque of induction motor 12 at or above an acceptable minimum level for efficient operation of induction motor 12. One skilled in the art will appreciate that the mechanical output of induction motor 12 may respond to changes in the torque current component more quickly than to changes in the flux current component. Thus, by further increases the torque current component, the mechanical output of induction motor 12 may be controlled most efficiently during aggressive acceleration/deceleration events. It should be appreciated that during normal operation of induction motor 12 (i.e. the speed of induction motor 12 is below the predetermined threshold and induction motor 12 is not experiencing an aggressive acceleration/deceleration event), controller 18 may maintain the flux current component and the torque current component at predetermined levels for normal operation. That is, because the output torque of induction motor 12 may decrease when the flux current component is reduced, controller 18 may maintain the flux current component when induction motor 12 experiences normal operation (i.e. it may be unnecessary to reduce the flux current component because the back EMF may be low and induction motor 12 may not operate undesirably). Operation of controller 18 will now be discussed in more detail with reference to FIGS. 2 and 3.

Controller 18 may determine voltage commands based on the speed and/or acceleration of induction motor 12. As such, controller 18 may monitor the speed of induction motor 12 by monitoring the signal generated by sensing device 14 (Step 300). Controller 18 may then determine an initial voltage command based on the sensed speed (Step 302). More specifically, flux map 26 may receive the speed of induction motor 12 and map it to an initial voltage command. If the speed is above a predetermined speed threshold (i.e. $\omega_{th}$), flux map 26 may map the speed to an initial voltage command included in field weakening portion 26b. However, if the speed is below the predetermined speed threshold, flux map 26 may map the speed to a predetermined maximum voltage command (i.e. $\lambda_{max}$) included in constant voltage command portion 26a. The resulting initial voltage command may be produced by flux map 26 as an output.

Controller 18 may also determine the acceleration of induction motor 12 based on the speed (Step 304). Controller 18 may determine the acceleration of induction motor 12 by first converting the speed to rpm. More specifically, speed converter 28 may receive the signal generated by sensing device 14 (e.g. the speed of induction motor 12 as measured in Hz), and convert it to the speed of induction motor 12 as measured in rpm, as discussed above. The unit-converted speed may then be differentiated over time by differentiator 30. It should be appreciated that the output of differentiator 30 may represent the acceleration of induction motor 12 as measured in rpm/second. Controller 18 may then determine an absolute value of the acceleration of induction motor (Step 306). More specifically, absolute value block 32 may receive the acceleration of induction motor 12, and convert it to the absolute value of the acceleration. That is, the output of absolute value block 32 may represent the positive magnitude of the acceleration of induction motor 12 as measured in rpm/second.

It should be appreciated that the output of differentiator 30, and thus the output of absolute value block 32, may include high-frequency signal noise. More specifically, the signal generated by sensing device 14 may include signal noise, as is known in the art, and this signal noise may be amplified in magnitude and/or frequency by differentiator 30. As such, controller 18 may filter high frequency signal noise from the acceleration signal (Step 308). More specifically, the absolute value of the acceleration may be passed through low pass filter 34 to reduce or eliminate the signal noise. In this manner, the output of low pass filter 34 may represent the absolute value of the acceleration with minimized or eliminated signal noise.

Controller 18 may then use the absolute value of the acceleration with minimized or eliminated signal noise to determine a de-rate factor (Step 310). More specifically, de-rate factor map 36 may receive the output of low pass filter 34 and map it to a de-rate factor. If the acceleration is above a predetermined low acceleration threshold (i.e. $a_l$) and below a predetermined high acceleration threshold (i.e. $a_h$), de-rate factor map 36 may map the acceleration to a de-rate factor included in variable de-rate factor portion 36b. However, if the acceleration is above the predetermined high acceleration threshold, de-rate factor map 36 may map the acceleration to a predetermined minimum de-rate factor (i.e. $\kappa_{min}$) included in second constant de-rate factor portion 26c. Further, if the acceleration is below the predetermined low acceleration threshold, de-rate factor map 36 may map the acceleration to a predetermined maximum de-rate factor (i.e. one) included in first constant de-rate factor portion 26a. The resulting de-rate factor may be produced by de-rate factor map 36 as an output.

Controller 18 may then filter high-frequency changes in the de-rate factor (Step 312). More specifically, the de-rate factor output of de-rate factor map 36 may be passed to variable low pass filter 38 to reduce a rate of change of the de-rate factor. As discussed above, controller 18 may change the cutoff frequency based on changes in the de-rate factor and/or the acceleration of induction motor 12 to maximize the efficiency of induction motor 12. For example, as the de-rate factor decreases (i.e. the magnitude of the acceleration of induction motor 12 increases), a faster decrease in the magnetic flux of induction motor 12 may accommodate the increasing speed of induction motor 12 by reducing the back EMF generated thereby. Thus, the cutoff frequency of variable low pass filter 38 may be set to a relatively high value (e.g. 3 Hz). While this faster decrease in the magnetic flux of induction motor 12 may serve to maintain the back EMF created by induction motor 12 at or below an acceptable level for efficient operation of induction motor 12, it may also reduce the output torque of induction motor 12. Thus, as the de-rate factor increases (i.e. the magnitude of the acceleration of induction motor 12 decreases), a slower increase in the magnetic flux of induction motor 12 may be sufficient to maintain the back EMF at or below an acceptable level for efficient operation of induction motor 12. In this case, the output torque of induction motor 12 may be maximized by reducing the cutoff frequency of variable low pass filter 38 (e.g. to 1 Hz). It should be appreciated that controller 18 may determine the filtered de-rate factor synchronously or asynchronously with the step of determining an initial voltage command based on the speed. That is, Steps 304-312 may be completed before Step 302, after Step 302, or substantially in parallel with Step 302.

Controller 18 may then use the initial voltage command from flux map 26 and the filtered de-rate factor from variable low pass filter 38 to determine a desired voltage command (Step 314). More specifically, multiplier 40 may receive the initial voltage command and the filtered de-rate factor and multiply them to determine a product. The product may be outputted by multiplier 40 as the desired voltage command (i.e. $\lambda^*$). The desired voltage command may then be delivered to inverter 16 for use in providing the one or more AC signals to induction motor 12, as discussed above.

Figure 3:
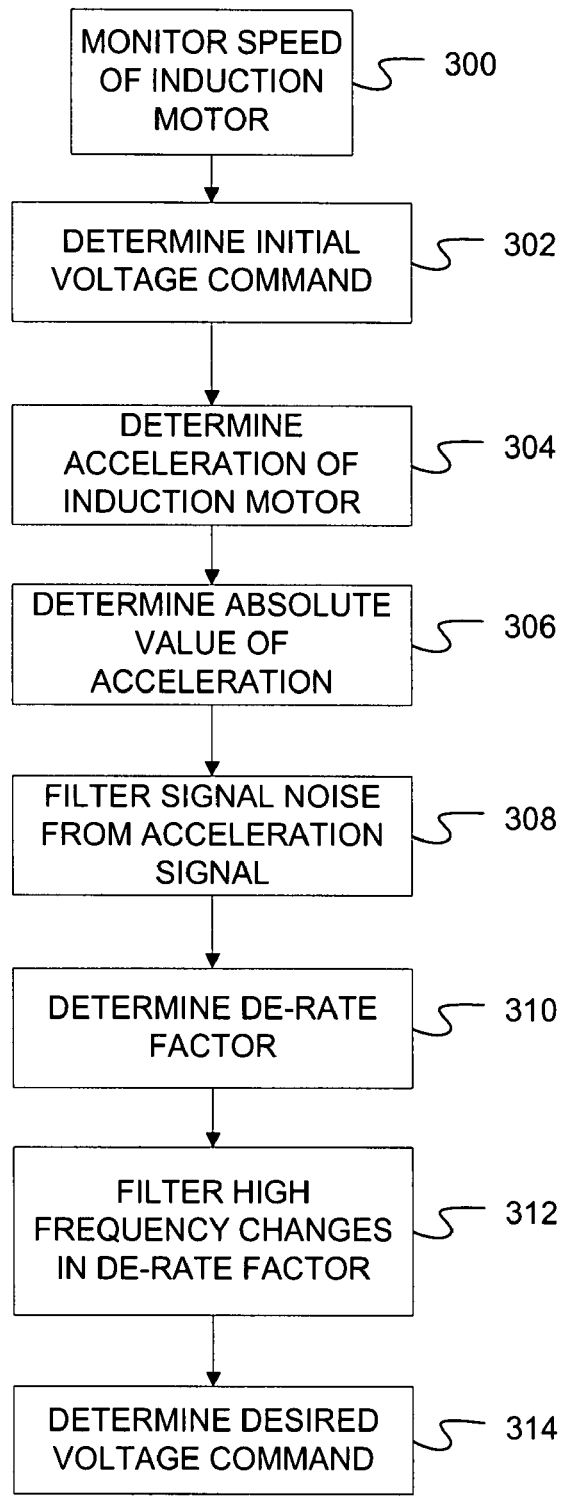
FIG. 3 is a flowchart depicting an exemplary disclosed operation of the field weakening control system of FIG. 1.

It should be appreciated that the method illustrated in FIG. 3 may provide efficient operation of induction motor 12 for any speed and/or acceleration of induction motor 12. For example, because the back EMF generated by induction motor 12 during normal operation (i.e. when the speed of induction motor 12 is below the predetermined speed threshold and the acceleration/deceleration of induction motor 12 is below the predetermined low acceleration threshold) may be sufficiently low for induction motor 12 to operate efficiently, it may be desirable to maximize the voltage command of induction motor 12 to thereby maximize the output torque of induction motor 12. Thus, during normal operation of induction motor 12, flux map 26 may map the speed of induction motor 12 to the maximum initial voltage command (i.e. "$\lambda_{max}$"), de-rate factor map 36 may map the acceleration of induction motor 12 to the maximum de-rate factor (i.e. one), and the desired voltage command may be determined by multiplier 40 as the product of the maximum initial voltage command and the maximum de-rate factor (i.e. $\lambda_{max} \times 1 = \lambda_{max}$). Alternatively, when induction motor 12 operates at high speeds (i.e. speeds higher than the predetermined speed threshold) and/or within aggressive acceleration/deceleration events, the disclosed method may serve to reduce the voltage command accordingly to maintain the back EMF at or below a level necessary for efficient operation of induction motor 12 while maintaining the output torque of induction motor 12 at or above a level necessary for efficient operation of induction motor 12.

The disclosed system and method may be implemented by relatively inexpensive components to provide maximized efficiency of an induction motor during aggressive acceleration/deceleration events. That is, because the disclosed system and method may use maps rather than complicated equations to determine desired voltage commands, it may be implemented using existing inexpensive components.

Further, because the disclosed system and method may be implemented using hardware blocks and maps rather than complicated equations to determine desired voltage commands, it may be implemented on a multipurpose processor or microprocessor without interfering with other tasks preformed by the processor or microprocessor. For example, the disclosed system and method may be implemented on an engine control module that may substantially simultaneously regulate other operations such as, for example, fuel injections to an engine. Also, because the disclosed system and method may be implemented on an existing processor or microprocessor, the cost of implementation may be further minimized.

Further still, because the disclosed system and method may require a minimal number of operating parameters of an induction motor for operation, it may be easy to use a single unit implementing the system and method with two induction motors having different values for those operating parameters.

It will be apparent to those skilled in the art that various modifications and variations can be made to the disclosed system and method without departing from the scope of the disclosure. Other embodiments of the system and method will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A field weakening control system for use with an induction motor, comprising:
    a sensing device configured to generate a signal indicative of a speed of the induction motor; and
    a controller configured to:
        determine an initial voltage command based on the signal;
        determine an acceleration of the induction motor based on the signal; and
        generate a desired voltage command based on at least one of the initial voltage command and the acceleration; wherein:
    the controller is further configured to determine a de-rate factor based on the acceleration; and
    the desired voltage command is generated based on at least one of the initial voltage command and the de-rate factor.

2. The field weakening control system of claim 1, wherein the controller is further configured to use a minimum de-rate factor as the de-rate factor when the acceleration of the induction motor is above a predetermined threshold.

3. The field weakening control system of claim 1, wherein the controller is further configured to filter the de-rate factor.

4. A method of controlling field weakening in an induction motor, comprising:
- monitoring a speed of the induction motor;
- determining an initial voltage command based on the speed;
- determining an acceleration of the induction motor; and
- generating a desired voltage command based on at least one of the initial voltage command and the acceleration, wherein:
- the method further includes determining a de-rate factor based on the acceleration; and
- the desired voltage command is generated based on at least one of the initial voltage command and the de-rate factor.

5. The method of claim 4, wherein determining a de-rate factor based on the acceleration includes at least one of:
- determining an absolute value of the acceleration; and
- filtering the acceleration.

6. The method of claim 4, wherein:
- the method further includes filtering the de-rate factor; and
- the desired voltage command is generated based on at least one of the initial voltage command and the filtered de-rate factor.

7. The method of claim 4, wherein generating a desired voltage command based on at least one of the initial voltage command and the de-rate factor includes determining a product of the initial voltage command and the de-rate factor.

8. A system, comprising:
- an induction motor;
- an inverter configured to apply voltage to the induction motor, wherein the current includes a flux current component and a torque current component;
- a sensing device configured to generate a signal indicative of a speed of the induction motor; and
- a controller configured to:
  - determine an initial voltage command based on the signal;
  - determine a derivative of the signal;
  - determine an absolute value of the derivative;
  - filter the absolute value of the derivative;
  - determine a de-rate factor based on the filtered absolute value of the derivative;
  - filter the de-rate factor;
  - generate a desired voltage command based on at least one of the initial voltage command and the filtered de-rate factor; and
- deliver the desired voltage command to the inverter.

* * * * *